United States Patent [19]

Morena

[11] Patent Number: 5,470,804
[45] Date of Patent: Nov. 28, 1995

[54] MILL ADDITIONS FOR SEALING GLASSES

[75] Inventor: Robert Morena, Lindley, N.Y.

[73] Assignee: Corning Incorporated, Corning, N.Y.

[21] Appl. No.: 285,232

[22] Filed: Aug. 3, 1994

[51] Int. Cl.$^6$ .................................................. C03C 8/24
[52] U.S. Cl. ............................. 501/15; 501/32; 501/76; 501/10; 501/17
[58] Field of Search ........................... 501/15, 76, 32, 501/17, 10

[56] References Cited

U.S. PATENT DOCUMENTS

| | | |
|---|---|---|
| 3,258,350 | 6/1966 | Martin et al. . |
| 3,859,126 | 1/1975 | Dietz et al. . |
| 3,951,669 | 4/1976 | Malmendier et al. . |
| 4,006,028 | 2/1977 | Nofziger . |
| 4,115,132 | 9/1978 | Suzuki et al. ................. 501/76 X |
| 4,131,478 | 12/1978 | Davis et al. . |
| 4,273,822 | 6/1981 | Bube . |
| 4,405,722 | 9/1983 | Kokubu et al. ................ 501/15 |
| 5,281,560 | 1/1994 | Francis et al. . |

FOREIGN PATENT DOCUMENTS 0213682  12/1983  Japan ....................... 501/15

*Primary Examiner*—Karl Group
*Attorney, Agent, or Firm*—Milton M. Peterson

[57] ABSTRACT

A sealing glass material comprising a thermally crystallizable, $PbO$—$ZnO$—$B_2O_3$ sealing glass flit and a mill addition selected from alumina, zircon, and manganese dioxide, the mill addition being in an amount sufficient to increase the mechanical strength in a fusion seal to at least 55.2 MPa(8000 psi), but the amount being not over about 5% by weight of the sealing material.

9 Claims, 1 Drawing Sheet

MILL ADDITIONS FOR SEALING GLASSES

FIELD OF THE INVENTION

Mill additions to enhance seal strength and accelerate crystallization rate in PbO—ZnO—$B_2O_3$ sealing glass frits that crystallize during the sealing step.

BACKGROUND OF THE INVENTION

Joining of component parts together with a fused glass seal to form a composite article is a well cultivated art. In particular, numerous special sealing glasses have been developed for use in joining glass parts with each other, or with metals, alloys, or ceramics.

In making a fusion-type seal, the material must be heated to a temperature where it becomes soft enough to wet the sealing surface and form an adherent, hermetic bond. For many purposes, it is desirable to maintain the sealing temperature as low as possible. This is particularly true in electrical and electronic articles where thermally sensitive parts or coatings are commonly employed.

Accordingly, considerable attention has been given to lead glasses as low temperature sealing glasses. For example, stable sealing glasses, having softening points in the 430°–500° C. range and linear coefficients of thermal expansion over the 0°–300° C. temperature interval in the 70–90×10$^{-7}$/°C. range, are disclosed in U.S. Pat. No. 2,642,633 (Dalton).

For many sealing and coating purposes, glasses are used in powder form, termed glass frits. One such application is forming a seal between the funnel and panel members of a cathode ray tube. Sealing glass frits are commonly mixed with an organic vehicle, such as amyl acetate, to form a flowable or extrudable paste. This mixture may then be applied to a sealing surface, e.g., the peripheral rim of a funnel or panel member. It is also known to incorporate mill additions in a glass frit mixture, a primary reason being modification and/or control of the ultimate coefficient of thermal expansion in a seal.

Industrial frit-sealing processes involve a secondary (post-seal) thermal treatment for metallizing, vacuum exhausting, or annealing. This second thermal step may be at a lower temperature than that of the sealing step. However, the temperature involved may be high enough to produce viscous deformation of the frit seal. This brings about distortion and misalignment of the sealed assembly.

As a solution to the problem, lead-zinc borate glasses were developed that, in frit form, thermally crystallized in situ. These frits remain relatively glassy for a period of time in the early part of a sealing step. This permits the glass to soften and flow to wet the sealing surface prior to crystallizing. Thereafter, with the sealing surface completely wet by the glass, the glassy frit crystallizes throughout to a rigid, deformation-resistant seal. This seal is capable of withstanding subsequent thermal processing, such as a vacuum bake-out, without distortion.

These thermally crystallizable lead-zinc borate, sealing glass frits have found broad application in the electronics industry. They are particularly useful in sealing together the panel and funnel members of a cathode ray tube. There is, however, a continuing search for improvements, both in the seal produced and in the sealing process.

The present invention provides specific mill additions to thermally crystallizable, lead-zinc borate sealing glass frits. These mill additions improve the mechanical strength of the seal produced. They also permit a faster sealing cycle by increasing the rate at which the glass frit crystallizes to form a rigid seal.

SUMMARY OF THE INVENTION

The invention resides in a sealing glass material comprising a thermally crystallizable, PbO—ZnO—$B_2O_3$ sealing glass frit and a mill addition selected from a group consisting of $Al_2O_3$, $MnO_2$ and zircon, the mill addition being present in an amount sufficient to increase the mechanical strength in a fusion seal to at least 55.2 MPa (8000 psi), but the amount being not over about 5% by weight of the sealing material.

The invention further resides in a composite article composed of at least two component parts joined by a fusion seal, the fusion seal being the fused and thermally crystallized product of a sealing glass material comprising a thermally crystallizable, PbO—ZnO—$B_2O_3$ sealing glass frit and a mill addition selected from the group consisting of $Al_2O_3$, $MnO_2$ and zircon, the mill addition being present in an amount sufficient to increase the mechanical strength of a fusion seal to at least 55.2 MPa (8000 psi), but the amount being not over about 5% by weight of the sealing material.

BRIEF DESCRIPTION OF THE DRAWING

The single FIGURE in the accompanying drawing is a schematic view in cross-section of a cathode ray tube blank embodying the invention.

DESCRIPTION OF THE INVENTION

Figure 1:
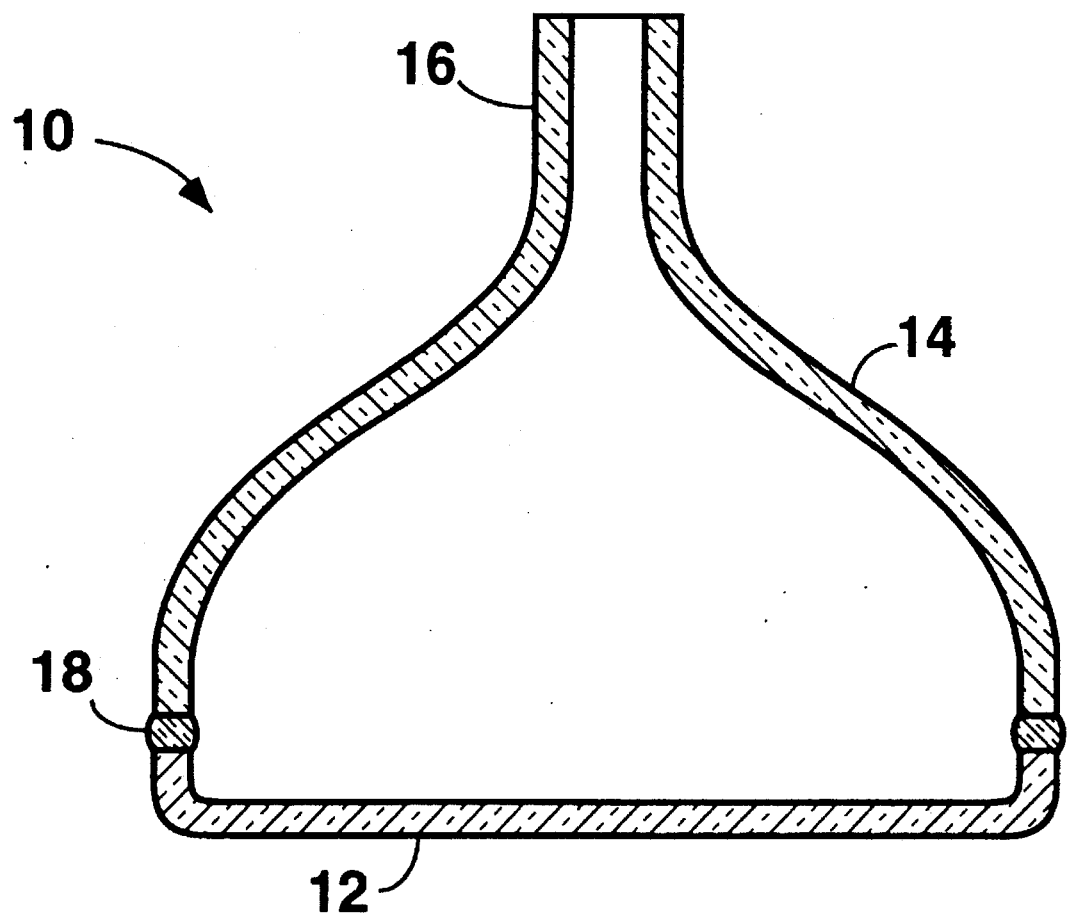

The present invention evolved from an on-going study of means for improving thermally crystallizable PbO—ZnO—$B_2O_3$ sealing glass frits. Such frits are widely used in low temperature (400°–500° C.) sealing of glass and ceramic parts. An application of particular interest is sealing together the panel (window) and funnel members of a cathode ray tube.

A PbO—ZnO—$B_2O_3$ sealing glass frit may, for example, consist essentially of, in percent by weight, 68–82% PbO, 8–16% ZnO and 6–12% $B_2O_3$. In addition, minor amounts up to about 5% of other oxides, such as $SiO_2$, BaO and $Al_2O_3$, may be present.

The single FIGURE in the accompanying drawing shows, in cross-section, a cathode ray tube blank, generally designated 10, produced in accordance with the present invention. Cathode ray tube blank 10 includes a panel member 12, a funnel member 14 and a neck member 16. Panel and funnel members 12 and 14 are joined together by a rigid seal 18 composed of a thermally crystallized, PbO—ZnO—$B_2O_3$ sealing glass having a mill addition in accordance with the present invention.

Currently, two lead-zinc borate glass frits are commercially available from Corning Incorporated, Corning, N.Y. under Code Numbers 7580 and 7590. Code 7580 is a vitreous sealing glass frit having a composition, in approximate weight percent on an oxide basis, as set forth in Table 1.

TABLE I

| | |
|---|---|
| PbO | 74.5 |
| ZnO | 12.9 |
| $B_2O_3$ | 8.4 |
| $SiO_2$ | 2.2 |
| BaO | 1.9 |
| $Al_2O_3$ | 0.03 |

Code 7590 contains about 1% zircon as a mill addition in Code 7580 frit. The zircon mill addition acts as a crystallization catalyst in the 7580 frit. It serves to initiate crystallization late in a sealing cycle.

Strength measurements were obtained by a method known as a Piston-On-Three-Ball (POTB) technique. In this procedure, a disk-shaped sample is positioned on three spaced balls held in a frame. A piston is forced against the center of the sample with increasing force until fracture occurs.

A frit seal in a large size cathode ray tube requires high strength and a high set point. The set point is the highest temperature at which a seal retains rigidity against deformation. These properties are required to withstand the stresses that occur during heating and cooling of the tube, and during exhaust, especially for larger-sized tubes.

Vitreous seals made with Code 7580 glass frit have mechanical strengths in the range of 34.5–38 MPa (5000–5500 psi) and a set point of about 300° C. These properties indicate that a vitreous flit seal is inadequate for sealing large size tubes.

Crystallized glass seals made with Code 7590 frit exhibit mechanical strengths in the range of 48.3–51.8 MPa (7000–7500 psi) and set points >450° C. It is apparent that a major change in properties occurs between vitreous and crystallized glass seals.

Certain cathode ray tube sealing operations require a dark-colored flit. This is deemed necessary to accurately assess frit coverage and flow by visual examination. The system devised consisted in mixing the zircon mill addition for Code 7590 with manganese dioxide to provide a black color in the material. Quite unexpectedly, when strength measurements were made on the color coded sealing material, it was found that a significant increase had occurred. Specifically, a value of 56 MPa (8110 psi) was observed in a seal prepared with the black material.

This observation led to an extended study of potential crystallization catalyst mill additions as a means of improving seal strength. As an incidental benefit, it has been found that, along with the increase in strength, a decrease in sealing cycle time may also be obtained.

For strength testing purposes, Code 7580 glass flit from a production lot was employed. This flit has a mean particle size of about 30 microns. Mill additions of potential crystallization catalysts were added to 100–200 gram batches of the glass flit. The batches were mixed by roller milling in a plastic jar for several minutes. Mixtures that showed promise were further tested in larger batches of one to two kilograms. These were mixed in a twin-shell mixer.

Samples for strength testing were prepared by adding a few drops of isopropanol to a batch of 30–35 grams of mixture. This mix was pressed in a cylindrical mold to form a disc that was fired at 440° C. A 2.5 cm (1") diameter disc was core drilled from the fired sample and ground and polished for strength testing. Multiple samples of each batch were tested for strength to provide mean strength values. Several different mill additions were tested at levels of 1%, 2% and 4% by weight. Table II reports the mean strength values, in MPa (psi) units, determined for various additives at the indicated three levels. Typical standard deviations were in the range 5 10% of the mean value. Code 7580, without any additive, was used for comparison or control purposes. It exhibited a strength of 36.0 MPa (5210 psi).

TABLE II

| | 1% | 2% | 4% |
|---|---|---|---|
| Additive | MPa psi | MPa psi | MPa psi |
| Zircon | 50.1/7260 | 52.2/7570 | 60.2/8720 |
| $ZrO_2$ | 39.4/5730 | 46.0/6660 | 51.5/7470 |
| $SnO_2$ | 44.2/6410 | 45.5/6610 | 39.8/5770 |
| $TiO_2$ | 47.5/6890 | 46.4/6710 | 37.1/5380 |
| $Al_2O_3$ (coarse) | 46.0/6660 | 45.6/6620 | 46.5/6750 |
| $Al_2O_3$ (fine) | 48.0/6970 | 46.1/6680 | 57.0/8280 |

The data in Table II indicate that zircon and fine alumina in amounts greater than 2% are effective additives for purposes of the invention. As noted earlier, 2% $MnO_2$ is also effective. Alumina, in amounts greater than 2% and up to about 5%, consistently provides the desired characteristics of improved mechanical strength, shorter sealing cycle time and acceptable flow prior to crystallization of a seal. For some reason, repeated tests with $MnO_2$ and with zircon do not always give consistent results. This may indicate sensitivity to the degree of mixing. Accordingly, alumina is a preferred crystallization catalyst.

It was found that the particle size of alumina is relatively critical to its success as a crystallization catalyst. Thus, essentially no benefit was obtained when commercial aluminas with a mean particle size greater than about 10 microns were employed. Preferably, the alumina will have a mean particle size less than 5 microns.

The effect of particle size may be seen from a test in which one batch was prepared with a 3% addition of alumina having a mean particle size of 13.2 microns. A second batch, for comparison was prepared with 3% alumina having a mean particle size of 3.3 microns. The batch with the coarser alumina gave a strength of 49.4 MPa (7160 psi), while that with the finer alumina gave a strength value of 57.9 MPa (8390 psi).

The data indicate that alumina functions as a heterogeneous, nucleation catalyst. Thus, it appears to provide a free surface to initiate crystallization.

Crystallization rates were measured using differential scanning calorimetry (DSC). For this purpose, powdered, unfired samples were prepared and heated on a schedule identical to that described for strength measurements. In general, two distinct crystalline compounds (each associated with a discrete crystallization peak or exotherm in the DSC measurement) will crystallize from a PbO—ZnO—$B_2O_3$ sealing frit.

For each run, the time from the start of the isothermal hold at 440° C. was recorded for the maximum ("peak") and end ("completion") of the second crystallization exotherm to occur. These parameters have been found to constitute an effective measure of crystallization time in this type of sealing operation. Typical values for a frit nucleated, as currently, by a 1% zircon mill addition, are 18–21 minutes for the DSC peak and 27–30 minutes for the DSC completion.

TABLE III sets forth the DSC crystallization time in minutes for the "peak" and "completion" times at the 440° C. hold for several different aluminas. The improvement in sealing cycle time obtained with fine aluminas is apparent from the data in TABLE III.

TABLE III

| Additive | Particle Size (microns) | Crystallization Time (min) | |
|---|---|---|---|
| | | Peak | Completion |
| 3% $Al_2O_3$ | 13.2 | 24.88 | 30.47 |
| 3% $Al_2O_3$ | 9.2 | 19.84 | 27.68 |
| 3% $Al_2O_3$ | 6.1 | 16.61 | 21.19 |
| 1.5% $Al_2O_3$ | 6.1 | 19.03 | 23.75 |

The data show a consistent trend of decreasing crystallization time as alumina particle size decreases at a constant amount of alumina added. Shorter crystallization times, providing they are not accompanied by a corresponding decrease in flow, permit a faster flit seal. In cathode ray tube manufacturing, this shortening of the sealing cycle is important since it contributes to higher productivity.

I claim:

1. A material for a fusion-type seal, the material consisting essentially of a thermally crystallizable, $PbO—ZnO—B_2O_3$ sealing glass frit and a mill addition, the mill addition consisting essentially of at least one additive that enhances seal strength, that is selected from a group consisting of alumina, zircon, and manganese dioxide, and that is present in an amount sufficient to provide a mechanical strength of at least 55.2 MPas (8000 psi) in a fusion seal made with the material, the amount of additive being at least 2%, but not over about 5% by weight of the sealing material.

2. A material in accordance with claim 1 having a mill addition of at least 2% manganese dioxide.

3. A material in accordance with claim 1 having a mill addition selected from the group consisting of alumina and zircon, the amount of the mill addition being greater than 2% by weight.

4. A material in accordance with claim 3 wherein the mill addition is alumina in an amount up 5% by weight.

5. A composite article composed of at least two component parts joined by a fusion seal, the fusion seal being the fused and thermally crystallized product of a sealing glass material consisting essentially of a thermally crystallizable, $PbO—ZnO—B_2O_3$ sealing glass frit and a mill addition selected from the group consisting of alumina, zircon, and manganese dioxide, the mill addition being present in an amount sufficient to provide a mechanical strength of at least 55.2 MPas (8000 psi) in the fusion seal, the amount of additive being at least 2%, but not over about 5% by weight of the sealing material.

6. A composite article in accordance with claim 5 wherein the article is a cathode ray tube blank comprising funnel and panel members joined by the fusion seal.

7. A material in accordance with claim 1 wherein the $PbO—ZnO—B_2O_3$ glass consists essentially of 68–82% PbO, 8–16% ZnO and 6–12% $B_2O_3$, these three oxides constituting at least 95% of the composition.

8. A material in accordance with claim 4 wherein the alumina has a mean particle size less than 10 microns.

9. A material in accordance with claim 1 which is capable of being completely crystallized in less than 27 minutes to form a fusion seal.

* * * * *